H. GRAUMÜLLER.
BRAKE FOR USE ON HOISTING DEVICES.
APPLICATION FILED MAR. 27, 1914.
1,154,508.
Patented Sept. 21, 1915.
2 SHEETS—SHEET 1.
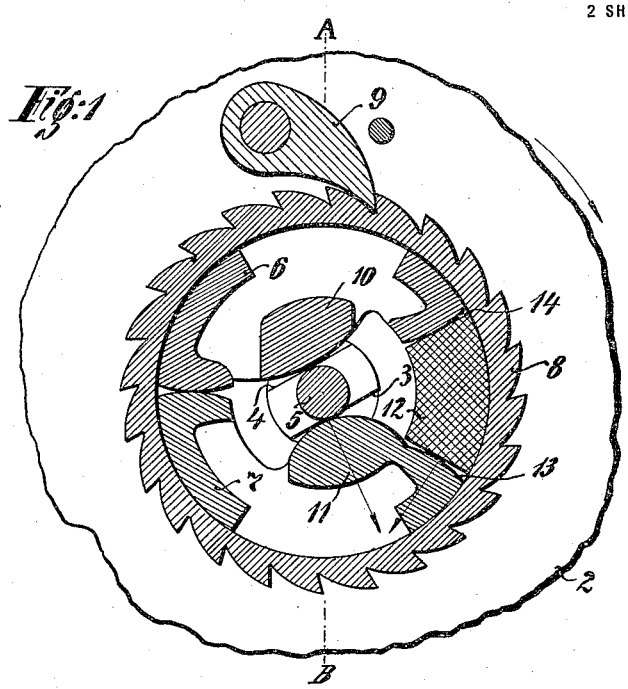
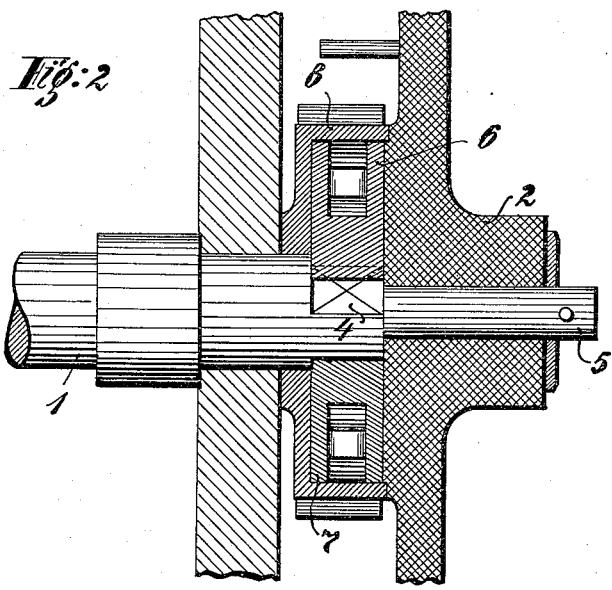
Witnesses:
B. Dommers
E. Leckert
Inventor.
Hermann Graumüller
By [signature]
Atty.

H. GRAUMÜLLER.
BRAKE FOR USE ON HOISTING DEVICES.
APPLICATION FILED MAR. 27, 1914.
1,154,508.
Patented Sept. 21, 1915.
2 SHEETS—SHEET 2.
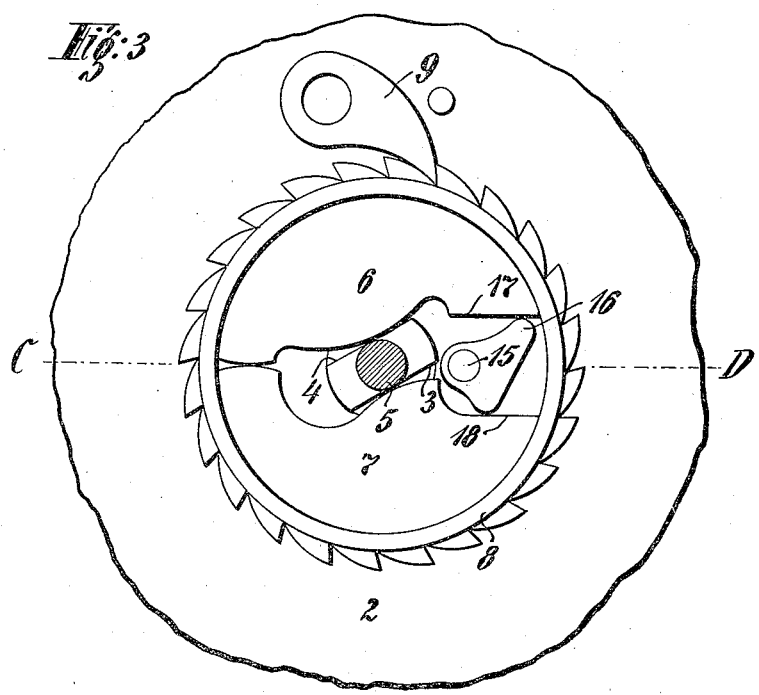
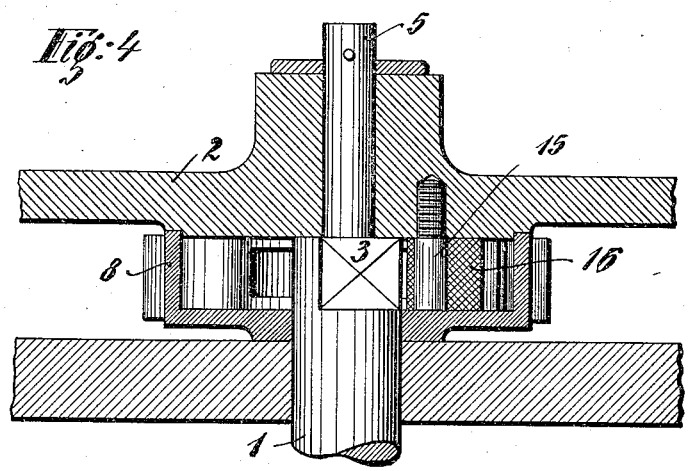

UNITED STATES PATENT OFFICE.

HERMANN GRAUMÜLLER, OF BERLIN, GERMANY.

BRAKE FOR USE ON HOISTING DEVICES.

1,154,508.  Specification of Letters Patent.  Patented Sept. 21, 1915.

Application filed March 27, 1914. Serial No. 827,709.

*To all whom it may concern:*

Be it known that I, HERMANN GRAUMÜLLER, engineer, a citizen of the German Empire, and resident of Berlin, Germany, have invented certain new and useful Improvements in Brakes for Use on Hoisting Devices; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a brake for use on such hoisting devices in which only one brake drum is provided which is rotatable in the hoisting direction, and one pair of brake blocks or cheeks which are adapted to be operated by a cam on the drum shaft.

The main feature of the invention consists in that the cam on the drum shaft is formed by two essentially parallel opposite surfaces whose points of contact with the curved pressure-transmitting surfaces of the braking cheeks are positioned opposite one another in such a manner that on the application of pressure on the two cheeks a rolling-off action takes place at the surfaces in contact, and that even in case any amount of play should happen to occur, the leverage of the turning moment which is exercised upon the drum shaft by reacting forces remains constant in order to obtain a braking efficiency which remains constantly proportional to the hoisting efficiency.

The improved brake is suitable for heavy loads. Alterations in the parts of the brake which are caused by wear, do not affect the operation of the brake as there the leverages do not alter and consequently the reacting forces will remain proportional under the same loads. A jamming or wedging action of the various parts is rendered impossible.

In the accompanying drawing two examples of the invention are illustrated.

Figure 1 is a section through one construction, and Fig. 2 is a section on line A—B of Fig. 1. Fig. 3 shows a modified form of the invention, of which Fig. 4 is a section on line C—D of Fig. 3.

In these drawings 1 denotes the drum shaft while 2 is the driving member by means of which the load is hoisted in known manner or lowered when running in reversed direction, for example by means of a control chain. The drum shaft is provided with a cam consisting of two oppositely arranged, preferably parallel, straight surfaces 3 and 4, which are formed by flattening the periphery of the shaft near one end thereof, (these surfaces may be of a certain curvature if desired) the driving part 2 is mounted upon an extension 5 of shaft 1. Two brake blocks or cheeks 6 and 7 are provided which may be hollow as usual and which may have parts out in order to take up the grease or lubricant. They are adapted to bear against the inner side of the rim of the brake drum 8 which latter is provided with external teeth adapted to be engaged by a pawl 9. The innermost surfaces 10 and 11 of the brake cheeks extend as near as possible to the shaft 5 and their points of contact with the parallel surfaces 4 of the shaft are diametrically opposite. A projecting part 12 serving as a cam is provided on the driving member 2 and is placed between the two cheeks 6 and 7.

The device works as follows: When the driving member 2 is rotated toward the right as indicated by the arrow in Fig. 1, it presses against the surface 13 of the cheek 7 and the drum shaft presses with its surface 3 against the surface 11 of the same cheek 7, while on the opposite side the surface 4 presses against the surface 10 of the cheek 6. Thus the cheeks and the brake drum 8 are coupled together and the load is lifted. If a pull is exerted on the driving member 2 in the reverse direction, the projecting part 12 will tend to withdraw from contact with the cheek 7, thereby causing a reduction of pressure in the braking cheeks and the load will sink downwardly according to the rotation of part 2. The inner surfaces of the braking cheeks 6 and 7 against which the faces 3 and 4 of the drum shaft are adapted to bear and the end faces 13 and 14 against which the ends of part 12 are adapted to bear, are of a convex curvature. This formation and the surface 13 of the braking cheek 7 results in that certain reacting forces are called into existence which act at an acute angle toward each other as shown by the arrows. If this angle is sufficiently pointed the result is obtained, that the cheek 7 is pressed violently outward and against the inner circumference of the brake drum 8 in an approximately radial direction. By making the faces of 11, and 10, as well as of 13 and 14 rounded, as shown in the drawing, the further advantage is obtained that a rolling off motion takes place between the surfaces in contact, instead of the usual sliding or grinding motion, which prevents the formation of undesirable play, even when the brake is frequently used. A small amount of wear between the surfaces 3, 11, and 4, 10 will not cause jamming or clamping of the parts and even if play should occur, no alteration will take place in the leverage of the turning moment which is exerted by the reacting forces upon the drum shaft. Consequently the braking action will always be proportional to the lifting action. An advantage of this construction consists also in that movable intermediate members, which would have to transmit the force to the braking cheeks, are entirely avoided.

In Figs. 3 and 4 like references are used for the corresponding parts. The difference in the construction as shown in these figures from that shown in Figs. 1 and 2 consists in that a bolt 15 is screwed to the driving member 2. This bolt lies obliquely between the surfaces 17, 18 of the braking shoes 6 and 7 respectively. It will be seen from Fig. 3 that when pressing the bolt 15 downwardly, the cam 16 will tend to force the braking shoes 6 and 7 away from each other. If on the other hand an upwardly directed force is exerted upon the bolt 15, a loosening takes place in that the cam 16 pivots over to the right.

This improved brake makes it possible to arrest a load at any desired and freely suspended position by pulling the driving member 2 by means of the control chain in the lifting sense, whereby the brake shoes are forced apart to some extent. The braking pressure already existing from the movement of the load is hereby sufficiently increased to hold the load freely suspended at any intermediate position. Lowering is also effected by the control chain which, for this purpose, is slightly pulled in the lowering sense thus causing the cam between the braking cheeks to lift. The lowering speed may be regulated by more or less tightly pulling the chain as this more or less reduces the braking pressure. When lowering the load normally, the attendant may let the control chain glide lightly through his hand in order to be able at any moment to arrest the load at the desired position by a slight pull on the chain.

What we claim and desire to secure by Letters Patent, is:

1. A brake for hoists, comprising a drum rotatable in one direction, a pair of blocks within the drum and arranged to be moved into frictional engagement therewith, a shaft passing through the drum, a cam on the shaft centrally engaging the inner surfaces of the blocks, a driving member, a projection on the latter extending within the drum between the blocks and coöperating with the cam to move said blocks into frictional contact with the inside of the drum.

2. A brake for hoists comprising a drum rotatable in one direction, a pair of blocks within the drum having contact at one end with each other and with the inner surface of the drum, a shaft passing through the latter, a cam on the shaft having contact with the blocks, a driving member, and a projection on the latter extending into the drum and into contact with the other ends of the blocks.

3. A brake for hoists, comprising a drum rotatable in one direction, a pair of blocks arranged within the drum and in frictional contact therewith, said blocks having curved end faces and inner curved surfaces between said ends, a shaft passing through the drum, a cam on the shaft in contact with said curved surfaces of the blocks, a driving member, and a projection on the latter extending into the drum and in contact with said end faces.

4. A brake for hoists, comprising a drum rotatable in one direction, a pair of blocks arranged within the drum in frictional contact therewith and in contact with each other at one end, a shaft passing axially through the drum, a cam on the shaft centrally engaging said blocks, a driving member, a pivoted cam on said member extending within the drum in engagement with the blocks at one end and coöperating with the cam to push the blocks into frictional contact with the inside of the drum.

5. A brake for hoists, comprising a drum rotatable in one direction, a pair of blocks within the drum having contact with each other at one end and with the inner surface of the drum, a shaft passing through the drum, a cam on the shaft in contact with the blocks, a driving member alongside the drum, and a pivoted cam on the said member extending into the drum and into contact with the other ends of the blocks.

6. A brake for hoists, comprising a drum rotatable in one direction, a pair of blocks arranged within the drum in frictional contact therewith, said blocks having curved end faces and inner curved surfaces between said ends, a shaft passing through the drum, a cam on the shaft in contact with said curved surfaces, a driving member, and a pivoted cam on the latter extending into the drum and into contact with said curved ends of the blocks.

In testimony that I claim the foregoing as my invention, I have signed my name in presence of two subscribing witnesses.

HERMANN GRAUMÜLLER.

Witnesses:
  HENRY HASPER,
  WOLDEMAR HAUPT.

Copies of this patent may be obtained for five cents each, by addressing the "Commissioner of Patents, Washington, D. C."